March 15, 1932.  R. PAWLIKOWSKI  1,849,380
INTERNAL COMBUSTION ENGINE
Filed March 26, 1930   2 Sheets-Sheet 2
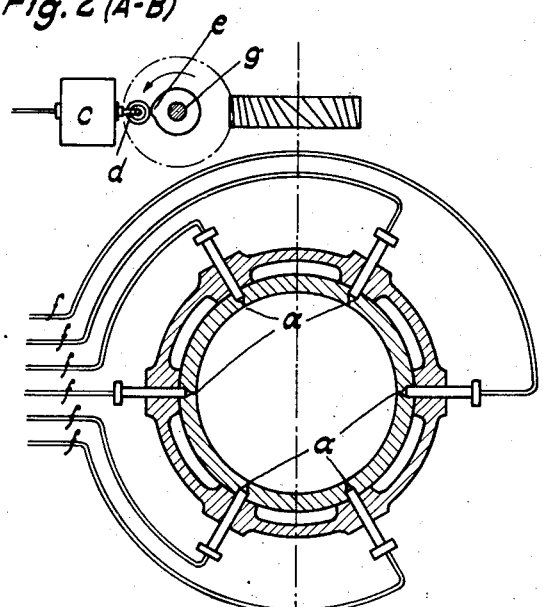
Fig. 2 (A-B)
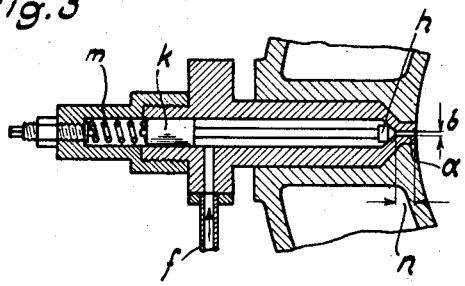
Fig. 3
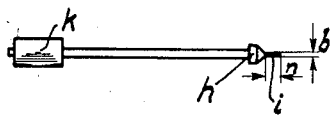
Fig. 4
Inventor:
Rud. Pawlikowski Patented Mar. 15, 1932

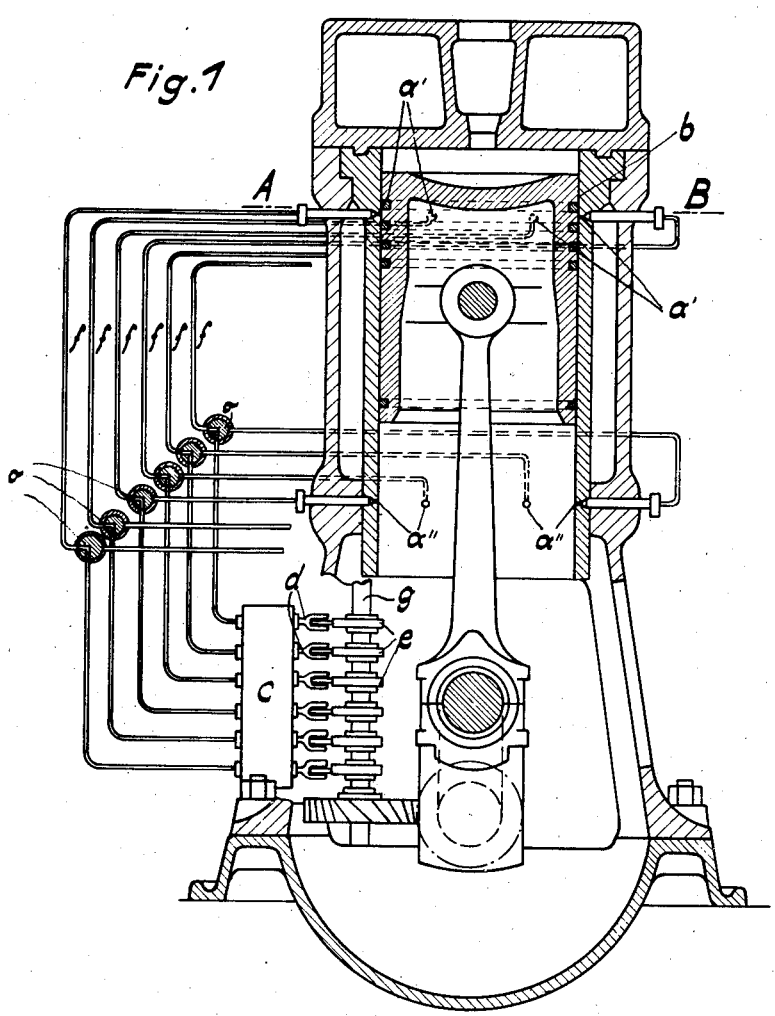

1,849,380

UNITED STATES PATENT OFFICE

RUDOLF PAWLIKOWSKI, OF GOERLITZ, GERMANY

INTERNAL COMBUSTION ENGINE

Application filed March 26, 1930, Serial No. 439,253, and in Germany November 24, 1927.

My invention relates to an internal combustion engine particularly for powdered fuels, and having several piston lubricating points arranged round the circumference of the cylinder. The invention consists in the fact that each lubricating point is provided with a separate pump plunger.

It has already been proposed to arrange a lubricating pump for each cylinder or in the case of double acting machines, on each side of the cylinder, or one pump plunger has been provided for each lubricating oil pipe which however feeds several lubricating points. These arrangements have the drawback however that in case of a stoppage of one lubricating point, the oil emerges from the common feed pipe at the lubricating points which are still free whilst the cylinder and piston are not lubricated at all at the choked lubricating point. This running dry is often only noticed when the particular place has been damaged and the result is that the engine is put out of commission for some time.

The internal combustion engine according to the invention eliminates these drawbacks in a simple manner. Stoppages at these points are practically impossible.

Fig. 1 shows a vertical longitudinal section through the internal combustion engine.

Fig. 2 shows a horizontal cross-section on line A—B of Fig. 1.

Fig. 3 shows an example of the lubricating points drawn to a larger scale. Fig. 4 is a detail.

The lubricating points $a$ (Fig. 1) are distributed in any number, preferably round the entire circumference of the cylinder. Each separate lubricating point $a$ is provided with a special oil pipe $f$, which is supplied from a special pump plunger $d$. Thus if a lubricating hole becomes choked up, the hole may always be forced clear again by the pump plunger belonging to it. The lubricating pump $c$ need only operate during the compression stroke in the four-stroke engine and may be driven for instance from the camshaft $g$. In two-stroke engines the lubricating pump should operate during each piston stroke and preferably is driven from the engine shaft.

The stoppage of a lubricating point, particularly by coal dust, is also further prevented according to the invention by a spring-loaded shut-off valve $h$ (Figs. 3, 4) being arranged at each lubricating passage $a$ entering into the cylinder, the said valve opening under the oil propulsion pressure. The valve has a needle $l$ passing into the oil passage so that due to the backward and forward motion of the valve $h$, the passage is scraped free of products of combustion which have penetrated therein (Fig. 3). At the other end the valve is provided with a piston $k$ which can have any diameter desired. The lubricating oil pressure from the pipe $f$ thus lifts this large piston with considerable force and thus tensions a powerful valve spring $m$. The valve $h$ (Fig. 4) is provided with a needle extension $i$ preferably of length $n$. When the valve is closed this needle extension does not quite fill the passage $d$. Whilst the very small space between the side of the hole and the needle $i$ can fill with ash, yet under the valve motion, when the valve $h$ comes back on the seating under powerful pressure, the space is again cleared by the needle $i$. The shut-off valves $h$ lie quite close to the wall of the cylinder so that the oil pressure can be effective in the cylinder in a very short time. This rapid injection of the lubricating oil is imperative in the case of pulverized fuel engines in order that the lubricating oil can be delivered smartly and with impulse into the cylinder between the piston rings at predetermined piston positions.

The engine according to Fig. 1 has two circular rows of lubricating points at the circumference of the cylinder. By changing over the three-way cocks $o$, which if required may also be connected up by a common handle, either the top lubricating point $a'$ or the bottom on $a''$, but only one of them at a time, may be supplied with oil.

What I claim is:

1. In an internal combustion engine, particularly for pulverized fuels, a plurality of piston lubricating points arranged round the circumference of the cylinder and adapted to force the lubricant directly between the piston rings, a separate pump ram for each lubricating point, all pump rams being driven from a common shaft, the said shaft deriving its motion from a rotating engine part so that the pump rams force oil between the piston rings in rhythm with the engine cycle.

2. In an internal combustion engine particularly for pulverized fuels, the plurality of piston-lubricating points arranged round the circumference of the cylinder, each lubricating point being provided with a separate oil pump and a spring-loaded sealing valve, the said valve having a needle adapted to penetrate into the lubricating orifice and to move under the pressure of the lubricant when the valve is opened, so as to keep the lubricating passage free from products of combustion.

In testimony whereof I affix my signature.

RUDOLF PAWLIKOWSKI.